United States Patent
Sorensen

(10) Patent No.: US 7,006,982 B2
(45) Date of Patent: Feb. 28, 2006

(54) PURCHASE SELECTION BEHAVIOR ANALYSIS SYSTEM AND METHOD UTILIZING A VISIBILITY MEASURE

(75) Inventor: Herb Sorensen, Corbett, OR (US)

(73) Assignee: Sorensen Associates Inc., Troutdale, OR (US)

( * ) Notice: Subject to any disclaimer, the term of this patent is extended or adjusted under 35 U.S.C. 154(b) by 0 days.

(21) Appl. No.: 10/115,186

(22) Filed: Apr. 1, 2002

(65) Prior Publication Data

US 2002/0178085 A1 Nov. 28, 2002

Related U.S. Application Data

(60) Provisional application No. 60/291,747, filed on May 15, 2001, provisional application No. 60/291,746, filed on May 15, 2001.

(51) Int. Cl.
 *G06F 17/60* (2006.01)
(52) U.S. Cl. ...................................................... 705/10
(58) Field of Classification Search .................. 705/10; 250/22.2
 See application file for complete search history.

(56) References Cited

U.S. PATENT DOCUMENTS

| | | | | |
|---|---|---|---|---|
| 5,287,266 A * | 2/1994 | Malec et al. | ..................... | 705/1 |
| 5,305,197 A * | 4/1994 | Axler et al. | ................... | 705/14 |
| 5,541,835 A * | 7/1996 | Dextraze et al. | .............. | 705/10 |
| 5,630,068 A * | 5/1997 | Vela et al. | ....................... | 705/1 |
| 5,821,513 A * | 10/1998 | O'Hagan et al. | ........... | 235/383 |
| 5,910,769 A * | 6/1999 | Geisler | ..................... | 340/568.5 |
| 5,918,211 A * | 6/1999 | Sloane | ......................... | 705/16 |
| 5,974,396 A * | 10/1999 | Anderson et al. | ............. | 705/10 |
| 6,011,487 A * | 1/2000 | Plocher | ................. | 340/825.49 |
| 6,112,988 A * | 9/2000 | Powell | ........................ | 235/383 |
| 6,317,718 B1 * | 11/2001 | Fano | .............................. | 705/1 |
| 6,381,583 B1 * | 4/2002 | Kenney | ........................ | 705/26 |
| 6,388,688 B1 * | 5/2002 | Schileru-Key | .............. | 345/854 |
| 6,421,080 B1 * | 7/2002 | Lambert | ..................... | 348/143 |
| 6,659,344 B1 * | 12/2003 | Otto et al. | .................. | 235/381 |
| 6,820,062 B1 * | 11/2004 | Gupta et al. | .................. | 705/16 |
| 6,836,773 B1 * | 12/2004 | Tamayo et al. | ................ | 707/6 |
| 2002/0062245 A1 * | 5/2002 | Niu et al. | ...................... | 705/14 |
| 2002/0161651 A1 * | 10/2002 | Godsey et al. | ................ | 705/22 |
| 2003/0039379 A1 * | 2/2003 | Gutta et al. | ................. | 382/116 |

FOREIGN PATENT DOCUMENTS

| | | | | |
|---|---|---|---|---|
| DE | WO 99/14694 | * | 3/1999 | |
| JP | 2001-331875 A | * | 5/2000 | |
| JP | 2003-16243 A | * | 7/2001 | |

OTHER PUBLICATIONS www.premiercarts.com—Shopping cart manufacturer web site archived on Aug. 17, 2000.*
Lam, Shun Yin, "Uncovering the Multiple Impacts of Retail Promotion on Appeal Store Performance", Dec. 1997.*

(Continued)

*Primary Examiner*—Susanna M. Diaz
*Assistant Examiner*—Scott L. Jarrett
(74) *Attorney, Agent, or Firm*—Alleman Hall McCoy Russell & Tuttle LLP

(57) ABSTRACT

A system and method for analyzing shopper behavior of a shopper within a shopping environment is provided. The method typically determining the position of a product within the shopping environment, tracking a shopper path of a shopper through the shopping environment, via a wireless tracking system, and calculating a product-shopper proximity measure based at least in part on a physical distance of a shopper traveling along the shopping path from the position of the product.

1 Claim, 8 Drawing Sheets

OTHER PUBLICATIONS

Srivastava, Jaideep et al., Web Usage Mining: Discovery and Applications of Usage Patterns for Web Data ACM SIGKDD Explorations, Jan. 2000, pp. 1-12.*

Zaiane, Osmar et al., Discovering Web Access Patterns and Trends by Applying OLAP and Data Mining Technology on Web Logs, Proceedings of the Advances in Digital Libraries Conference, 1998, ISBN:0-8186-8464-X.*

Peacock, Peter, Data mining in marketing Marketing Management, Winter 1998, vol. 6, No. 4, pp. 8-18.*

Greening, Dan R., Tracking users Web Techniques, Jul. 1999, vol. 4, No. 7, pp. 50-58.*

Underhill, Paco, Why We Buy: The Science of Shopping Simon & Schuster 1999, ISBN: 0-684-84913-5.*

Envirosell.com—Research Report, Sample Retail Report, Articles about Envirosell web pages 1999-2000, Retreived Apr. 6, 2005 from WebArchive.org.*

Gaynor, Mark, Hidden Camera Reveal Human Side of P-O-P- Story P-O-P Times, 1999, Retreived Apr. 6, 2005, WebArchive.org.*

Hammonds, Keith, How We Sell Fast Company, Nov. 1999. *

* cited by examiner

PURCHASE SELECTION BEHAVIOR ANALYSIS SYSTEM AND METHOD UTILIZING A VISIBILITY MEASURE

CROSS-REFERENCE TO RELATED APPLICATIONS

This application claims priority under 35 U.S.C. §119 to U.S. provisional patent application Ser. No. 60/291,747, entitled "PURCHASE SELECTION BEHAVIOR ANALYSIS SYSTEM BASED ON LINKED PURCHASE RECORDS AND SHOPPING PATH CHARACTERISTICS," filed on May 15, 2001, and to U.S. provisional patent application Ser. No. 60/291,746, entitled "CONSTRAINED STATISTICALLY ENHANCED LOCATION AND PATH ANALYSIS SYSTEM," filed on May 15, 2001, the entire disclosure of each of which is herein incorporated by reference.

TECHNICAL FIELD

The present invention relates generally to a marketing analysis system, and more particularly to a marketing analysis system based upon tracking shoppers and purchases in a shopping environment.

BACKGROUND

A wide variety of goods are sold to consumers via a nearly limitless array of shopping environments. Manufacturers and retailers of these goods often desire to obtain accurate marketing information concerning the customers' shopping habits, in order to more effectively market their products, and thereby increase sales.

One prior method of obtaining data on a shopper's habits is to have the shopper fill out a survey. However, customers may give inaccurate responses to survey questions, either due to forgetfulness, laziness, or deceit, may not understand the survey questions, or may not take the time to fill out a survey at all. Thus, the survey data may not accurately reflect the shopper's habits. This results in skewed survey data that misinforms the manufacturers and retailers, leading to misdirected and ineffective marketing efforts by the manufacturers and retailers.

It would be desirable to provide a system and method for inexpensively gathering accurate data related to the shopping habits of shoppers.

SUMMARY

A system, method, data compilation, and storage medium for analyzing shopper behavior of one or more shoppers within a shopping environment is provided. The method includes, determining the position of a product within the shopping environment, tracking a shopper path of a shopper through the shopping environment, via a wireless tracking system, and calculating a product-shopper proximity measure based at least in part, on a physical distance of a shopper traveling along the shopping path, from the position of the product.

According to another aspect of the invention, the method typically includes providing a shopping environment including products placed at predetermined locations in the shopping environment; tracking a shopper path of a shopper through the shopping environment; detecting that the shopping path is within a predefined region relative to a product; and determining a shopping behavior of a shopper within the predefined region.

The system typically includes a wireless tracking system configured to track the position of one or more shopper transmitters within a shopping environment having one or more products placed at predetermined locations therein; and a data analyzer configured to receive data from the wireless tracking system and reconstruct a shopper path based on the data. The data analyzer further is configured to analyze the shopper path in comparison to the locations of the products within the shopping environment, and, for each product, determine a product-shopper proximity measure based on a physical distance between the shopper traveling along the shopping path and/or a simulated visibility of the product from the line of sight of a shopper traveling along the shopping path.

The data compilation typically includes a measure that a shopper path of a shopper within a shopping environment is within a predefined region adjacent a product positioned in the shopping environment, and a determination of a shopping behavior of the shopper within the predefined region.

The storage medium typically is readable by a computer and has a program of instructions embodied therein that is executable by the computer to perform the steps of: providing a shopping environment including products placed at predetermined locations in the shopping environment; tracking a shopper path of a shopper through the shopping environment; detecting that the shopping path is within a predefined region relative to a product, wherein the predefined region is a region from which the shopper on the shopping path can see the product or a region within a predetermined physical proximity to the product; and determining a shopping behavior of a shopper within the predefined region, wherein the shopping behavior is selected from the group consisting of the shopper being physically present within the predefined region, the shopper slowing down within the predefined region, the shopper stopping within the predefined region, and the shopper purchasing a product within the predefined region.

DETAILED DESCRIPTION

Figure 1:
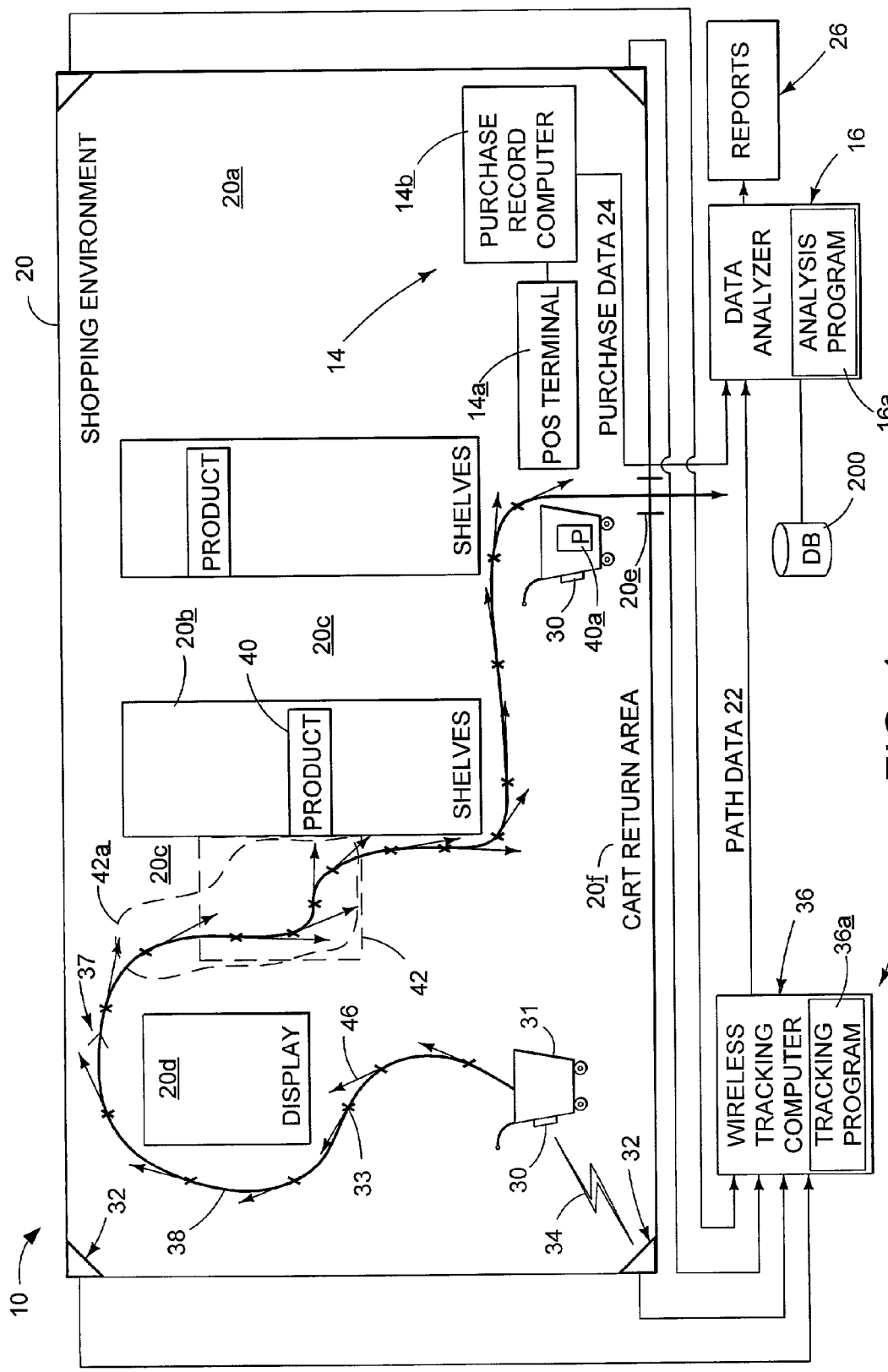
FIG. 1 is a schematic view of a system for collecting shopping behavior data according to one embodiment of the present invention.

FIG. 1 shows a purchase selection behavior analysis system according to one embodiment of the present invention generally at 10. System 10 typically includes a wireless tracking system 12 configured to monitor the position of a shopper and to transmit shopper path data 22 to a data analyzer 16, as well as a purchase record system 14 configured to identify, record and transmit purchase data 24 to data analyzer 16. Data analyzer 16 is configured to determine one or more shopping behaviors attributable to the particular shopper, based on path data 22 and purchase data 24. Data analyzer 16 is further configured to create a data compilation 26, or report 26, of these behaviors, based upon the path data and purchase data, such as reports 102, 103, described below. Typically the shopping environment is a retail store, such as a grocery store.

Wireless tracking system 12 is typically a local positioning system (LPS) that includes transmitters 30 configured to emit tracking signals that are received by transceivers 32 and transmitted to a wireless tracking computer 36. Transceivers 32 may alternatively be receivers 32. The tracking signal may contain a unique transmitter identifier, and a tracking program 36a executed on the wireless tracking computer may be configured to resolve the position of the transmitter by examining relative strength and/or time differences in the signals received at each of the transceivers. Alternatively, the tracking signal may contain position information, such as coordinates resolved using a Local Positioning System receiver or other tracking system component. The transmitters and transceivers are typically configured to send and receive radio frequency signals, however, it will be appreciated that optical signals, infrared signals, or other forms of tracking signals may also be used.

Transmitters 30 typically transmit a tracking signal 34 every 4 seconds, but alternatively may transmit at virtually any other time interval suitable for tracking a shopper, including continuously. It will be appreciated that transceivers 32 are typically located at the perimeter of the shopping environment, but alternatively may be located in any suitable position to receive tracking signal from transmitters 30, including other positions in the store or even outside the shopping environment.

Each transmitter 30 is typically attached to a shopping cart 31, which may be a hand-held, push-type or other cart. Because the motion of the cart and shopper substantially correspond, the shopper path may be tracked by tracking the motion of the transmitter on the cart. Alternatively, the transmitter may be attached directly to a shopper, for example, via a clip or other attachment mechanism, or to some other form of customer surrogate, such as a coupon, clipboard, or other handheld device.

As the shopper travels with cart 31 around shopping environment 20, transceivers 32 receive periodic tracking signals 34 from the transmitter 30 and forward the tracking signals 34 to wireless tracking computer 36. Wireless tracking computer 36 is configured to reconstruct a shopper path 38 based on the tracking signals and to transmit path data 22 to data analyzer 16. The path data is typically in the form of path records, 202, discussed below.

Shopping environment 20 includes a selling floor 20a configured with shelves 20b that carry products 40, and partition the floor into aisles 20c. Shopping environment 20 may also include displays 20d positioned at various locations on the shopping floor. Shopping environment 20 also typically includes an entrance/exit 20e, and a cart return area 20f.

Returning to FIG. 1, typically transceivers 32 are hardwired to wireless tracking computer 36, but alternatively may be configured in virtually any way suitable for transmission of tracking signal 34 from the transceivers 32 to wireless tracking computer 36. Wireless tracking computer 36 typically is a separate computer from data analyzer 16, but may be the same machine as data analyzer 16 or of virtually any other configuration suitable for reconstructing shopper path 38. Wireless tracking computer 36 is typically hardwired to data analyzer 16, but may be of virtually any other configuration that allows path data 22 to be transferred or used by data analyzer 16.

Figure 11:
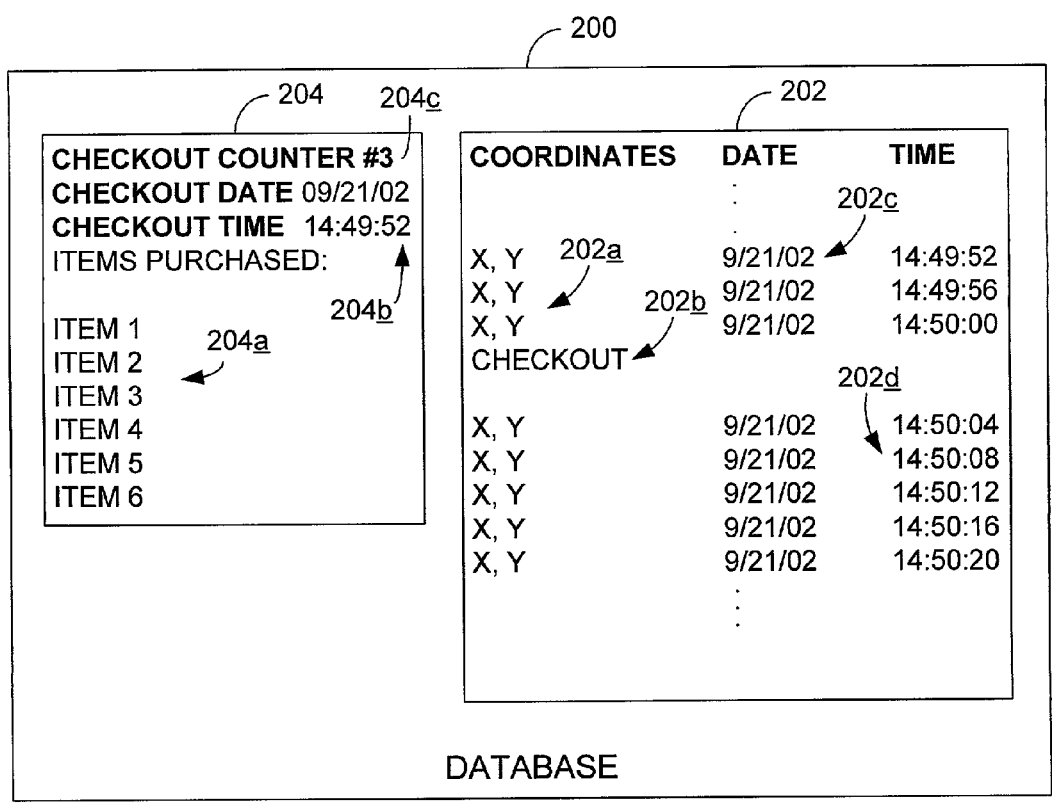
FIG. 11 is a schematic view of a path record and a purchase record utilized by the data analyzer of the system of FIG. 1.

Typically, shopping path 38 is reconstructed by analyzing a plurality of detected tracking signals 34 over time, and calculating a series of positions 33 of the transmitter throughout the shopping environment 20. As shown in FIG. 11, the series of positions is typically represented by an array of coordinate pairs in a path record 202. Typically a shopper path is determined to have started when motion of a particular transmitter is detected near a cart return area near the entrance of the shopping environment. To determine where one shopping path ends, data analyzer 16 is typically configured to detect whether the position of the transmitter is adjacent point of sale terminal 14a of purchaser record system 14, indicating that the shopper is at the check out counter, purchasing items. Alternatively, the cart may have a barcode or tag that can be scanned by the point of sale terminal or other scanner to link the shopper path and the purchase record. Alternatively, these functions may be performed by a tracking program 36a on wireless tracking computer 36.

Shopper path 38 is typically reconstructed by wireless tracking computer 36 (or alternatively by data analyzer 16) by connecting the series of positions 33, and smoothing the resultant polygonal line. Suitable methods for use in reconstructing the shopping path are described in co-pending U.S. provisional patent application Ser. No. 60/291,746, filed May 15, 2001, entitled "Constrained Statistically Enhanced Location and Path Analysis System," the entire disclosure of which is herein incorporated by reference.

For each position along shopper path 38, data analyzer 16 is configured to calculate a line of sight 46, which is typically tangent to the shopper path and facing in the direction of a velocity vector at that point on the shopper path. Typically, the line of sight is calculated in two dimensions, however, it will be appreciated that the line of sight may be calculated in three dimensions and may take into account banners, displays and other objects placed within shopping environment 20.

Figure 3:
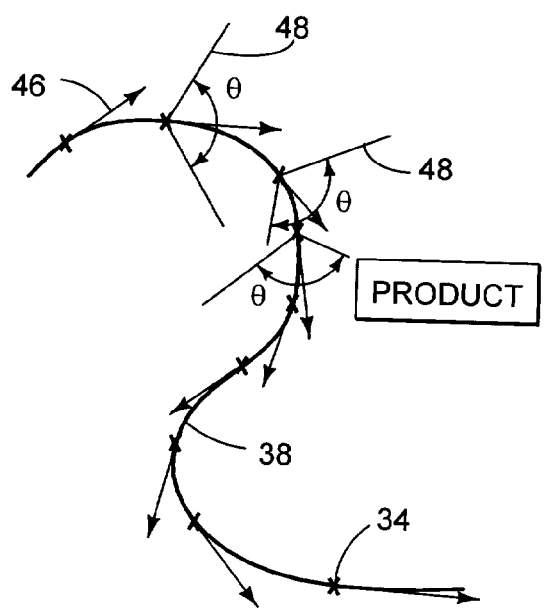
FIG. 3 is a schematic view showing the relationship between a shopper path and lines of sight from a plurality of positions along the shopper path.
Figure 4:
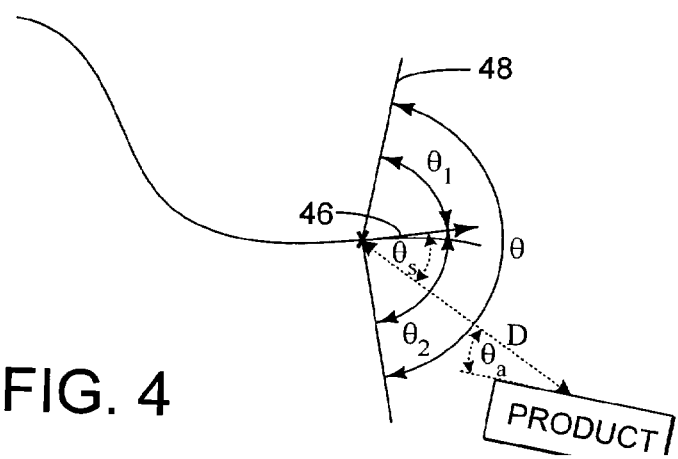
FIG. 4 is a schematic view of the field of vision of a shopper traveling along a shopping path.

Further, for each position along shopper path 38, data analyzer 16 is configured to calculate a field of view 48 facing in the direction of travel of the shopper. As shown in FIGS. 3–4, field of view 48 is typically calculated by determining an angle $\theta$, which represents the angular breadth of the shopper's field of view. Angle $\theta$ is composed of constituent angles $\theta_1$ and $\theta_2$. Where $\theta$ is centered along the line of sight 46, $\theta_1$ and $\theta_2$ are typically equal. Alternatively, field of view $\theta$ may not be centered on the line of sight, and angles $\theta_1$ and $\theta_2$ may be different. Angle $\theta$ typically ranges from about zero to about 180 degrees. According to one embodiment of the invention, Angle $\theta$ is less than about 90 degrees, and according to another embodiment angle $\theta$ is less than about 45 degrees.

System 10 further includes a purchase record system 14 having a plurality of Point-of-sale (POS) terminals 14a and a purchase record computer 14b. POS terminal 14a is configured to identify and record purchased products 40a, thereby generating a purchase record 204 (shown in FIG. 11) for each shopper. Point-of-sale terminal 14a typically includes a scanner and cash register, but may alternatively include virtually any other components configured to identify and record purchased products. These purchase records are sent as purchase data 24, via purchase record computer 14b, to data analyzer 16. Purchase record system 14 is typically hardwired to data analyzer 16, but may be of virtually any other configuration that allows transmission of purchase data 24 to data analyzer 16. As shown in FIG. 11, each purchase record 204 of purchase data 24 typically includes a list of items 204a along with a date and a time 204b of checkout, as well as a POS terminal identifier 204c. The purchase record 24 is typically stored in a database 200 associated with the data analyzer, along with path records 202 received from wireless tracking system 12, discussed below.

Data analyzer 16 receives path data 22 from wireless tracking system 12 and purchase data 24 from point-of-sale terminal 14 and determines which particular path data corresponds to which particular purchase data 24. The path data 22 typically contains a plurality of path records, and the purchase data typically contains a plurality of purchase records, each of which are stored in database 200. Data analyzer 16 includes an analysis program 16a configured to link purchase records 204 from purchase record system 14 with path records 202 from wireless tracking system 12. The linking of information from systems 12 and 14 provides an objective set of data corresponding to each shopping path 38. Typically, the analysis program 16a is configured to examine the checkout time 204b and checkout location (i.e. POS terminal ID) against the path records and determine the path that has a position adjacent the POS terminal at the same time the purchase record was generated, to thereby match the path and purchase records. Alternatively, the cart or transmitter itself is scanned at checkout, and the analysis program 16a is configured to detect a transmitter/cart identifier and checkout time associated with a particular purchase record, in order to link the shopper path and purchase record.

Further, information from customer account, such as a frequent shopper card account or discount card account may be linked to the path data and the purchase data. Typically, a shopper's frequent shopper or discount card is read by the point of sale terminal at the time of checkout, and linked with the purchase data and path data. The frequent shopper or discount card may be linked to an associated database record containing historic purchase data, demographic data, or other information associated with a particular frequent shopper or discount card. Data analyzer 16 may be configured to store a plurality of shopping paths recorded on multiple shopping trips taken by the owner of each frequent shopping or discount card. Thus, the data analyzer may be configured to compare the shopping paths for a particular frequent shopper or discount card over an extended period of time. The data analyzer may also be configured to impute or predict a path in the same or a different shopping environment for a particular shopper based at least in part on the historic shopper path data from prior shopping trips linked to the frequent shopping or discount card. Thus, data analyzer may be used to predict the effectiveness of a display location, without actually positioning the display in the shopping environment and collecting new shopper data.

In addition to imputing shopper paths, data analyzer 16 is also typically configured to derive many different shopping behaviors based upon the path and purchase data. These shopping behaviors include, but are not limited to the behaviors 108 described below with reference to FIG. 8.

A plurality of products 40 typically are positioned at predetermined locations within shopping environment 20. Data analyzer 16 is configured to recognize a predefined region 42 relative to each product 40. Predefined region 42 may also be referred to as a zone, and may have one or more subzones. Typically the product is located within the predefined region 42, and the predefined region extends around the product by a distance R, which may be constant, or more typically, variable. The predefined region may alternatively be adjacent the product or separated by some predetermined distance from the product. The predefined region may be virtually any shape suitable for detecting meaningful shopper behaviors. For example, the predefined region may be rectangular, curved, polygonal, etc.

The predefined region alternatively may be defined by the field of view 48 for a shopper traveling along a given path 38, as shown at 42a. Predefined region 42a is thus defined as the region from which the product 40 is within the shopper's field of view when traveling along a particular shopping path.

Product-shopper visibility measure 44 is a measure of how long a product is visible to a shopper as a shopper travels along shopper path 38. The visibility measure is calculated using lines of sight 46, which face in the direction of travel of the shopper and simulate a direction that a shopper is looking as the shopper travels along shopper path 38.

Figure 2:
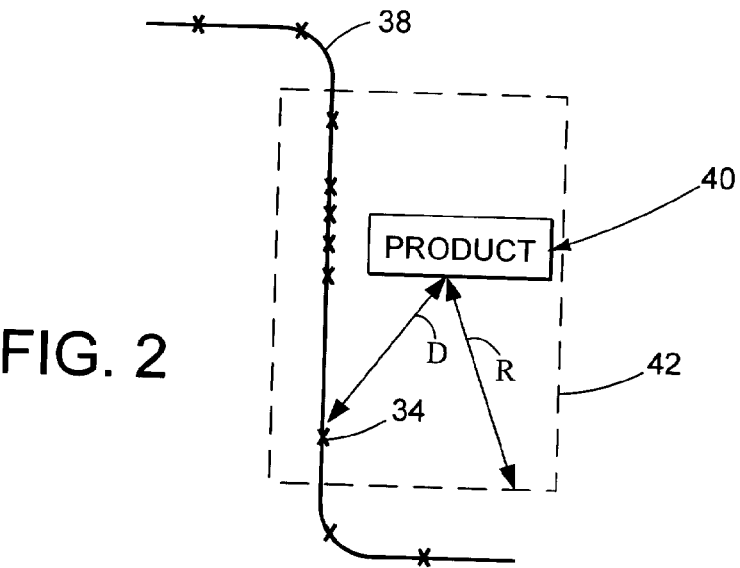
FIG. 2 is a schematic view showing a shopper path traveling through a predefined region adjacent a product.

FIG. 2 shows a predefined region 42 adjacent a product 40. The depicted shopper path 38 travels through the predefined region, and the shopper is detected at positions 33 that are closely spaced immediately next to the product. Because the tracking signals 34 are typically emitted by a transmitter at regular intervals, such as every four seconds, the distance between detected positions 33 typically indicates the speed of a shopper along shopper path 38. Thus, it can be determined, for example, that the shopper slowed down adjacent the product in FIG. 2, within the predefined region. After passing the product, the greater distance between the tracking signal indicates that a shopper has increased speed.

FIG. 3 shows a detail view of a line of sight 46 of a shopper on shopper path 38 as a shopper travels near product 40. Line of sight 46 is typically calculated as discussed above, and, along with field of view 48, also discussed above, simulates a direction in which a shopper may be looking as the shopper travels along shopper path 38. It may be useful to provide information about how long a product is within the line of sight or field of view of a shopper when each shopper is in a store, because a shopper may be more likely to buy a particular product if that product is visible to a shopper for a longer period of time. Further, if a shopper does not see a particular product, a shopper may be less likely to purchase that product. Therefore, it may increase sales of a particular product to position that product such that it is seen for longer periods of time by more shoppers.

Figure 5:
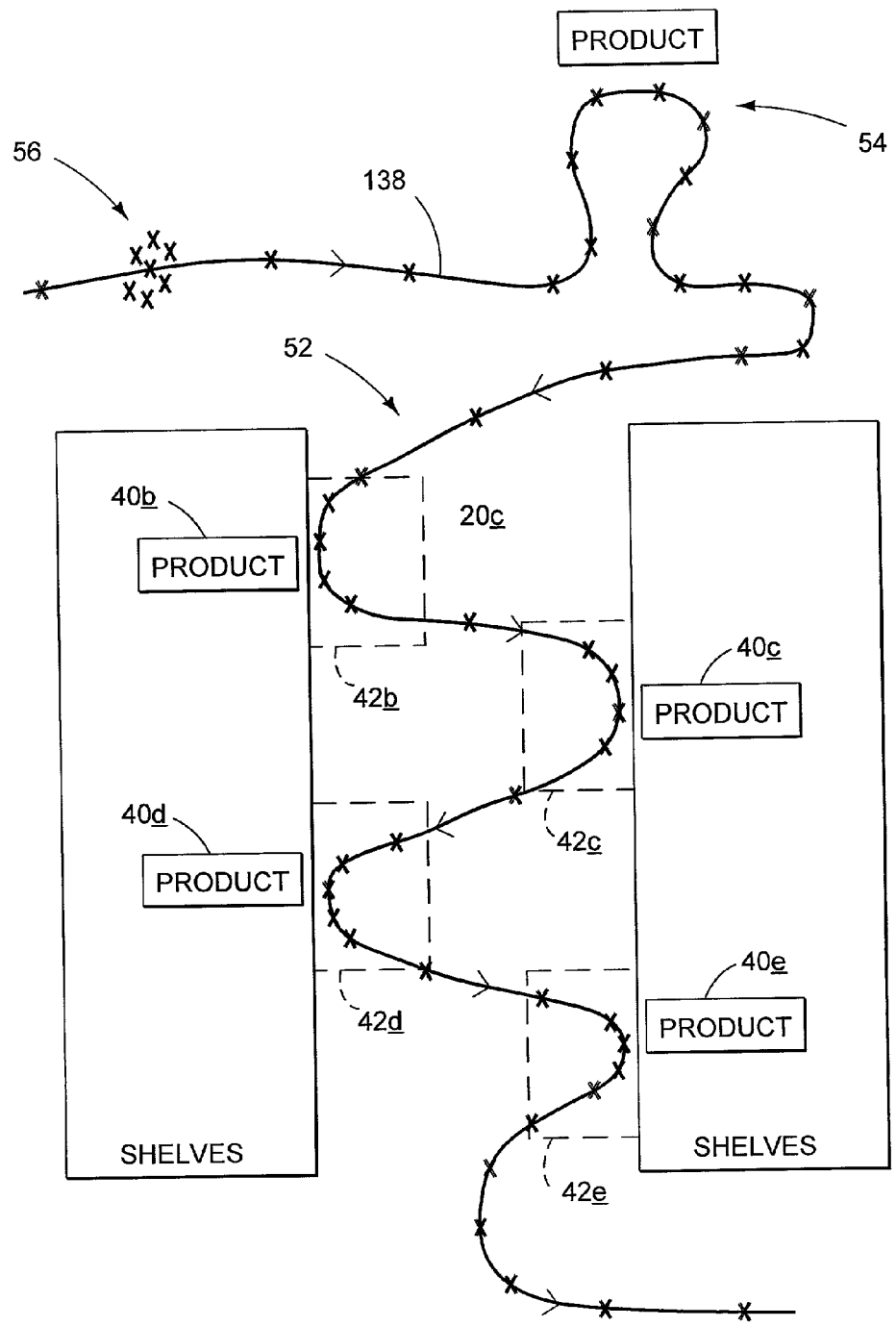
FIG. 5 is a schematic view of a shopper path exhibiting a loiter pattern, an excursion pattern, and a back and forth aisle-traverse pattern.

FIG. 5 depicts a shopper path featuring a plurality of patterns that data analyzer 16 is configured to recognize, including an aisle-traverse pattern 52, an excursion pattern 54, and a loitering pattern 56. Aisle-traverse pattern 52 is formed when a shopper travels the full length of an aisle, that is, enters an aisle through a first end and exits the aisle through an opposite end, fully traversing the aisle. The aisle-traverse pattern shown in FIG. 5 further includes a back-and-forth motion during which products 40b, 40c, 40d, 40e alternately come into the shopper's field of view. While traveling along this path, the shopper passes through predefined regions 42b, 42c, In FIG. 7, a shopper path is shown with two aisle-traverse patterns 52 that do not feature any back and forth motion.

Excursion pattern 54 is formed when a shopper abruptly changes direction, and travels for a short distance, only to return and resume the original direction of travel, such as when a shopper makes a short trip to retrieve a desired product. An excursion pattern may also be defined as the pattern formed when a shopper path enters and exits an aisle through the same end of the aisle, without fully traversing the aisle, as shown at 54 in FIG. 7. The shopper path shown in FIG. 7 includes three separate excursions 54.

Loitering pattern 56 is typically formed when a shopper remains in generally the same area for a period of time, indicated by a close cluster of detected positions 33. This typically occurs when a shopper is contemplating the purchase of a product, but may also occur when a shopper stays in one place for any reason for a length of time, or when the shopper abandons a cart.

Figure 6:
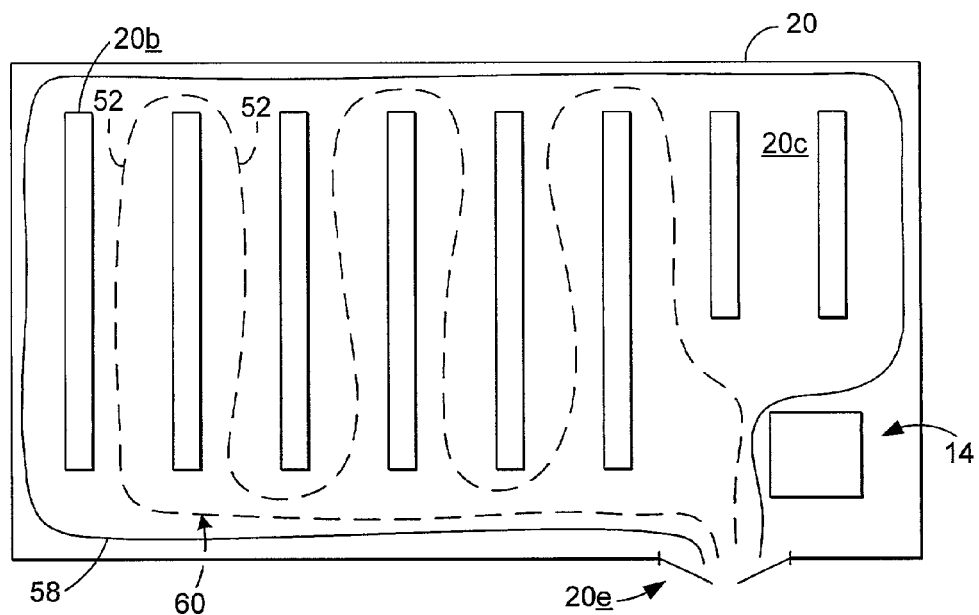
FIG. 6 is a schematic view of shopper paths exhibiting a perimeter pattern and a zigzag pattern.

As shown in FIG. 6, the data analyzer may also be configured to recognize a perimeter pattern 58, in which the shopper path encircles substantially all of a perimeter of the shopping environment. Data analyzer 16 may also be configured to recognize a zigzag pattern 60. Zigzag pattern 60 typically is formed by a shopper fully traversing a plurality of aisles in a back and forth manner, entering and exiting each aisle through opposite ends of the aisle, such that the final shopper path resembles a zigzag pattern. It will be appreciated that each zigzag pattern 60 is formed from a plurality of aisle-traverse patterns 52.

Figure 7:
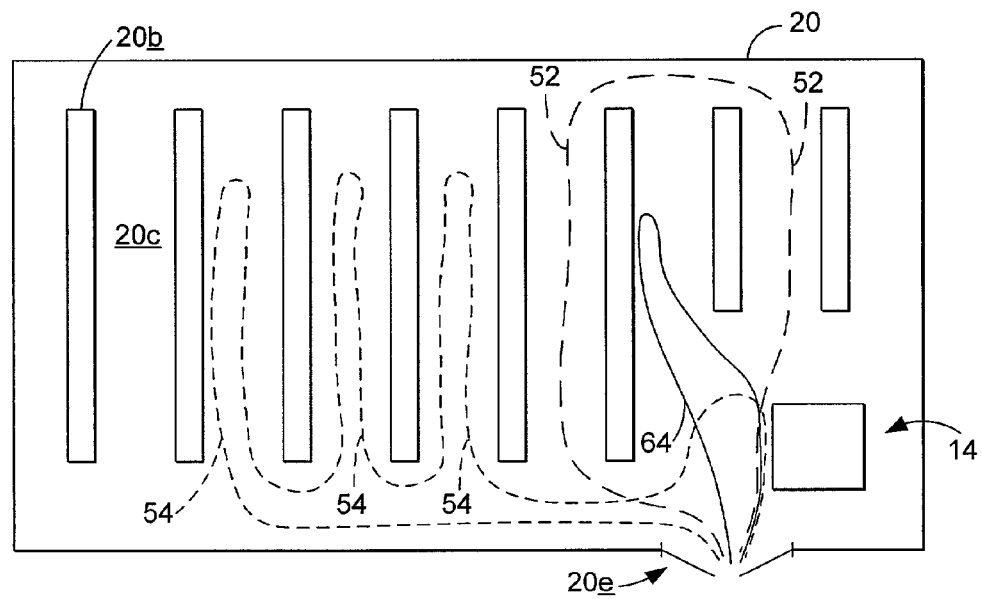
FIG. 7 is a schematic view of shopper paths exhibiting an excursion pattern, an aisle traverse pattern, and a destination pattern.

As shown in FIG. 7, the data analyzer may also be configured to detect a destination pattern 64, in which the shopper path enters the shopping environment, travels to a region from which one or more products are purchased, and then travels to POS terminal 14a. Typically, only a small number of products are purchased by the shopper on a trip that includes a destination pattern.

Data analyzer 16 may also be configured to recognize patterns based on the time duration of the shopping trip as well as the physical location of the shopper path. Typically, the data analyzer is configured to measure the time duration of each shopper path, and determine whether the time duration of the shopper path is within one or more predetermined time ranges, for example, a quick trip range, fill-in trip range, routine trip range, and stock-up trip range. Typically, the quick trip range is less than about 10 minutes, the fill-in trip range is between about 10 and 20 minutes, the routine trip range is between about 20 and 45 minutes, and the stock-up trip range is over about 45 minutes. Of course, it will be appreciated that data analyzer 16 may be configured to recognize a wide variety of time-based trip classifications, and the above described durations are given for exemplary purposes only.

Figure 8:
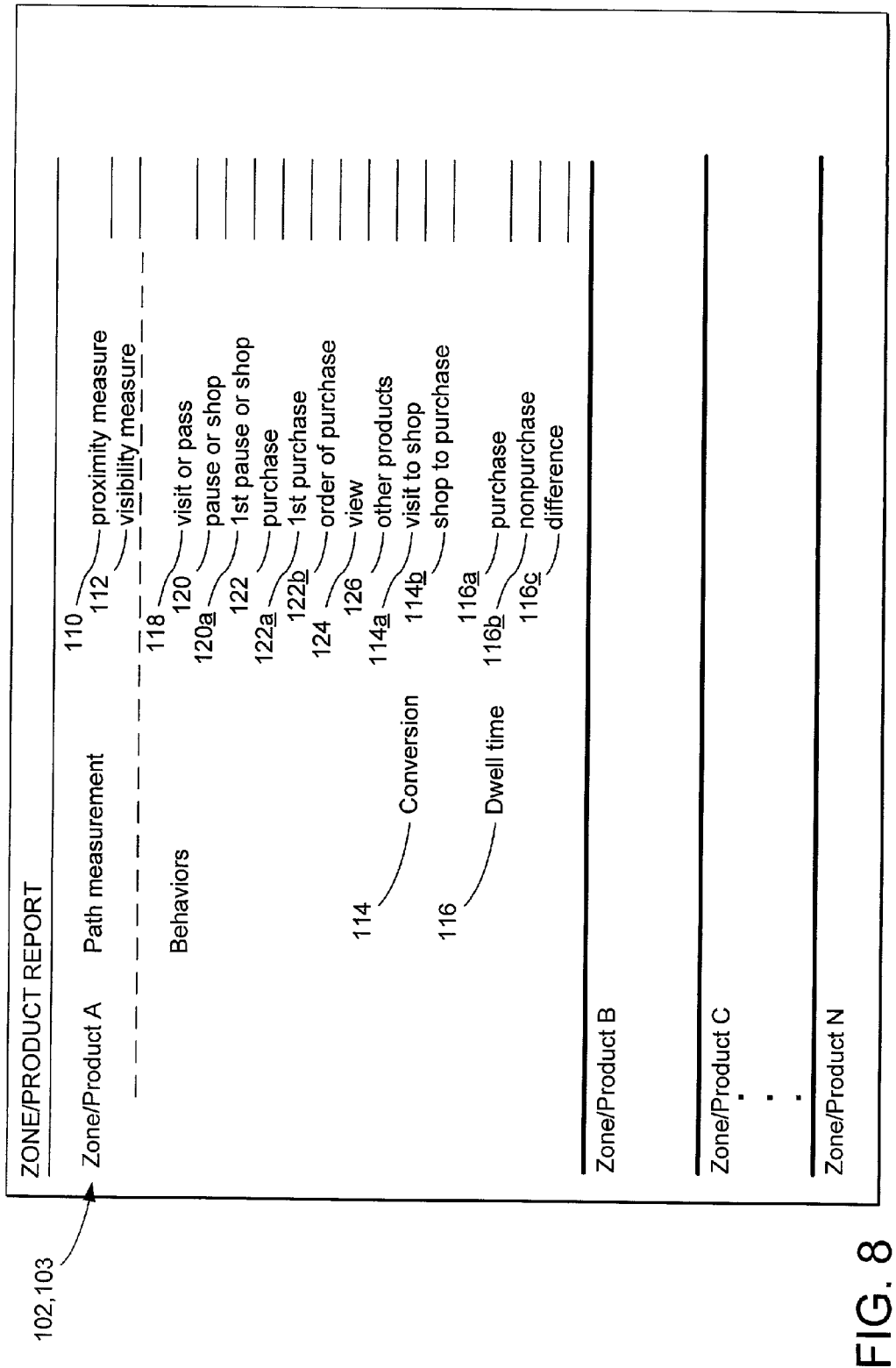
FIG. 8 is a schematic view of a data compilation according to one embodiment of the present invention.

FIG. 8 depicts a data compilation according to one embodiment of the present invention, shown generally at 100. Data compilation 100 includes various statistics for a plurality of products 102, e.g., Swiss cheese, milk, etc. While typically the compilation is arranged according to products 102, alternatively the data compilation may arranged according to zones or subzones 103. The zones or subzones may correspond to a particular product category, and therefore the compilation alternatively may be said to be arranged according to product category, such as "cheeses," or "dairy products."Alternatively the zones may correspond to a physical portion of shopping environment 20, such as the entrance/exit.

Data compilation 100 further includes path measurement statistics 106 and behavior statistics 108. Path measurement statistics 106 may include a shopper-product proximity measure 110 and a shopper-product visibility measure 112. The proximity measure is typically calculated by determining whether the shopper travels within the zone or predefined region adjacent a product. Data analyzer 16 is configured to make this determination by detecting that a portion of the shopper path lies within the predefined region.

Visibility measure 112 is typically a measure based in part on a simulated visibility of the product from a field of view of the shopper, or alternatively from a line of sight of the shopper, as the shopper travels along the shopping path. Thus, proximity measure 110 and visibility measure 112 are an indication the percentage or number of shoppers that see or pass within a predefined region associated with a product. The visibility measure is typically defined by the equation:

$$\text{Visibility measure} = \text{Sum}(1 \text{ to } z) \frac{[(\text{pass})(t)(\sin\theta_s)(\sin\theta_a)]}{D^2}$$

where Sum (1 to z) is the sum of all zones from which the zone for which the visibility measure is being calculated can be seen, pass is the percentage of shoppers who pass through each summed zone, t is the time shoppers spent in each summed zone, $\sin\theta_s$ is the sine of the angle from a line of dominant flow of shopper traveling through the "seeing" zone, $\sin\theta_a$ is the sine of the angle of the display to the line of sight, and D is the distance between the two zones. FIG. 4 illustrates the angles represented by $\theta_s$ and $\theta_a$, and the distance represented by D. It will be appreciated that a wide variety of other methods may be used to calculate the visibility measure.

Behaviors 108 include a wide variety of behaviors, including the shopper being physically present within the predefined region (VISIT OR PASS) 118, the shopper slowing down or stopping within the predefined region (PAUSE OR SHOP) 120, the shopper purchasing a product within the predefined region (PURCHASE) 122, and the shopper viewing a product within the predefined region (VIEW) 124. To determine whether the shopper is physically present in the predefined region at 118, the data analyzer 16 is configured to detect whether the shopper path passes through the predefined region. Thus, even if a detected position 33 of the transmitter 30 is not within the predefined region, the shopper may be presumed to have passed through the predefined region if the shopping path passes through the predefined region.

To determine if a shopper slows down at 120, data analyzer 16 is configured to detect if the shopper speed falls below a predetermined threshold within the predefined region. Slowing down is one indication that a shopper is "shopping," that is, is looking at a potential product that the shopper might wish to purchase. The predetermined threshold may be a relative decrease in speed, for example, if the shopper speed slows down by more than 20% in the predefined region as compared to an entry speed. Alternatively, the threshold may be an absolute speed below which the shopper is said to be slowing down, for example, less than 0.25 meters per second. The shopper may be determined to be "pausing" or "stopping" if two successive detected positions 33 of transmitter 30 are in substantially the same location.

To determine whether a product was purchased within the predefined region as indicated at 122, the data analyzer 16 is typically configured to examine the purchase data 24 (i.e., record 204) associated with the shopping path 38, in order to detect whether any products from the predefined region were purchased by the shopper. Typically, purchase measure 122 is a measure of all persons who purchase a particular product from the predefined region. Alternatively the purchase measure may be a measure of all persons who purchase any product from a given predefined region. Where the report is directed to a particular product, such as Swiss cheese, the report may include the percentage or number of purchasers of Swiss cheese who also purchased other products from the predefined region, such as cheddar cheese, as shown at 126.

In addition to the statistics shown at 118, 120, 122, and 124, the data compilation 100 typically further includes a first pause or shop measure 120a, a first purchase measure 122a, and an order of purchase measure 122b. The first pause or shop measure is typically a measure of the number or percentage of shoppers who first slow down or stop in a particular predefined region. For example, 8% of shopper may first slow down during their shopping trips in the predefined region surrounding the beer cooler. The first purchase measure is typically a measure indicating the percentage or number of shoppers who first purchased a product from a particular predefined region on a particular shopping trip. For example, the report may indicate that 6% of shoppers first purchased beer on their shopping trips to the shopping environment. Order of purchase is a measure indicating the relative order of a given purchase on a shopping trip. Typically the order of purchase measure is expressed on a scale of 1 to 10, such that a score of 2 indicates that a particular product or products from a particular zone are on average purchased earlier in a shopping trip, while a score of 8 indicates that the product(s) are on average purchased later in a shopping trip.

Data compilation 100 further includes other behaviors 108 such as conversions 114 and dwell times 116. Conversions 114 include a visit to shop measure 114a that indicates the percentage or number of shoppers who "converted" from being visitors to a region to "shoppers" in a region, that is, the percentage of shoppers who actually slowed down or paused within the predefined region divided by the percentage or number who entered the predefined region. This measure may be used to evaluate the effectiveness of a product display, advertising, or promotional item, for example. Conversions 114 may also include a shop to purchase measure 114b that indicates the number or percentage of shoppers that "converted" from shopping (i.e. slowing or pausing) in a predefined region to purchasing a product in the predefined region. Thus, the shop to purchase conversion measure 114b is typically calculated by dividing the number or percentage of shoppers who purchased a product in the predefined region, indicated at 122, by the number or percentage of shoppers who paused or shopped in the predefined region, indicated at 120.

Data compilation 100 also typically includes a plurality of dwell times 116, which generally indicate the amount of time shoppers spent in each predefined region. Dwell times 116 typically include purchase dwell time 116a, which indicates the amount of time purchasers of products in a predefined region spent in the predefined region; nonpurchaser dwell time, which indicates the amount of time nonpurchasers of products in a particular predefined region spent in the predefined region; as well as the difference 116c between the amount of time purchasers and nonpurchasers of products from a particular predefined region spent in the region.

Data compilation 100 may also include information on patterns detected in the shopper paths, including spatial patterns, such as the zigzag pattern, excursion pattern, loiter pattern, destination pattern, perimeter, and aisle-traverse pattern described above, as well as time-based patterns such indications of the percentage and number of shopper paths that fall within the quick trip range, fill-in trip range, routine trip range, and stock-up trip range discussed above.

Figure 9:
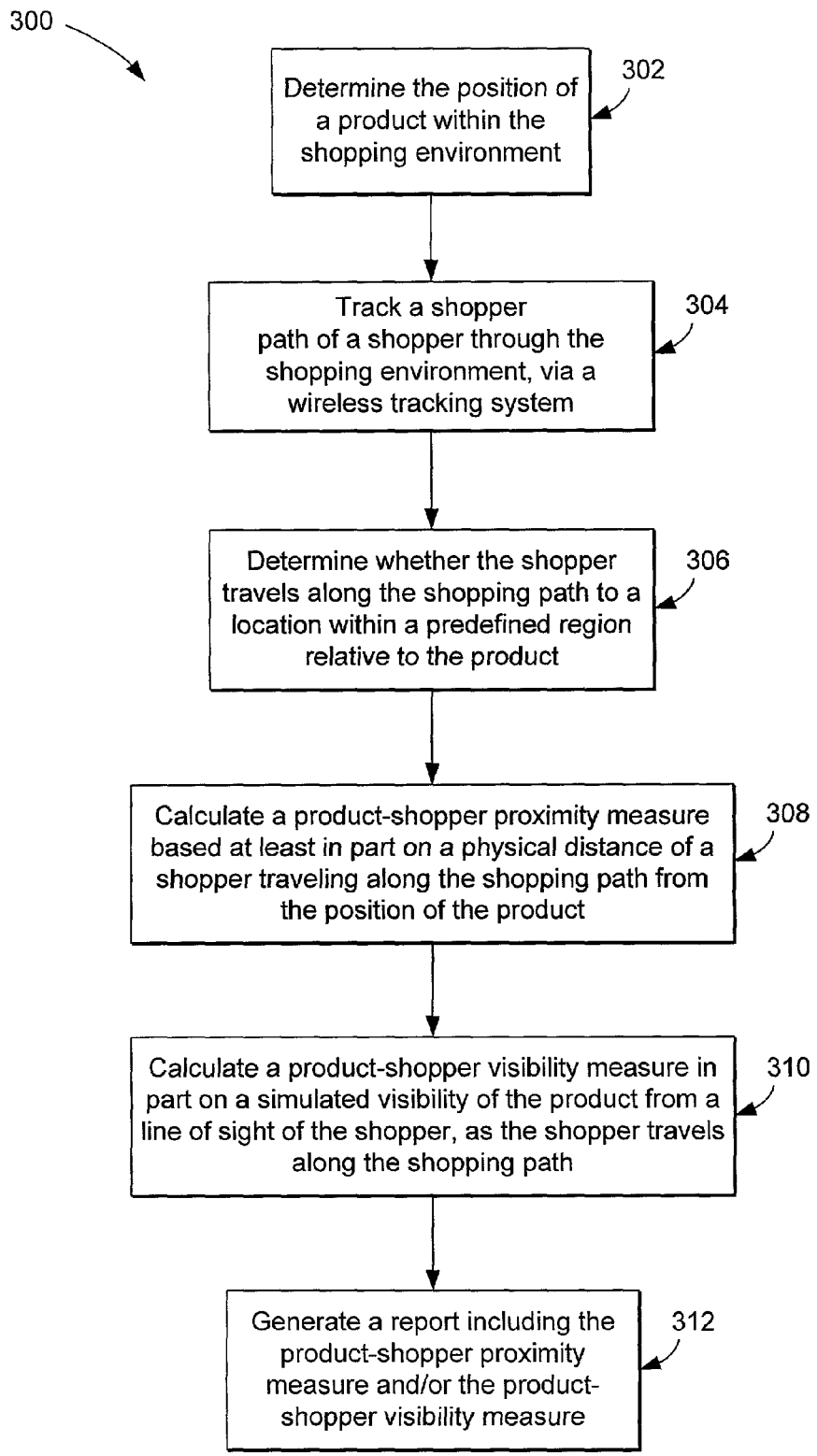
FIG. 9 is a flowchart of a method according to one embodiment of the present invention.

Turning now to FIG. 9, a method according to one embodiment of the present invention is shown generally at 300. Method 300 includes determining the position of a product within a shopping environment, at step 302. Typically, the positions of each product are recorded, in three dimensions, by a scanning device that is operated by a user traversing the shopping environment. Alternatively, the product positions may be recorded in only two-dimensions, or may be recorded in three dimensions in another manner, for example, by using a tape measure to record a height of each product. A record of these product positions is made, and the predefined regions are defined around certain products or groups of products.

At 304, method 300 includes tracking the shopper path of a shopper through the shopping environment with a wireless tracking system, as discussed above. The shopper path is typically tracked by detecting a periodic wireless tracking signal 34 from a transmitter attached to a surrogate for the shopper, such as a cart. From these signals, a series of coordinates for the shopper position are typically calculated, depending on relative signal strength, phase difference, or other signal characteristics. Tracking the shopper path typically includes reconstructing a shopping path from the coordinates, as described above. The method may further include detecting that at least a portion of the shopper path exhibits at least one of the following patterns: zigzag pattern, excursion pattern, loiter pattern, destination pattern, and aisle-traverse pattern, described above.

At 308, method 300 includes calculating a product-shopper proximity measure 110 based at least in part on a physical distance of a shopper traveling along the shopping path from the position of the product. The physical distance may be a measured distance D between the product and the shopper path, or the physical distance may be defined by a predefined region 42, discussed above. Thus, the product-shopper proximity measure may be a measure of the percentage of number of shopper paths that pass within a predefined region around a particular product, or that pass within a predetermined distance D of a product.

At 310, the method further includes calculating a product-shopper visibility measure based in part on a simulated visibility of the product from a field of view or line of sight of the shopper, as the shopper travels along the shopping path. From this measure, it may be estimated how long a particular product was visible to a shopper. The field of view may be of varying scope and typically faces parallel to the velocity vector of the shopper traveling along the shopping path, as discussed above.

At 312, the method may further include generating a report that includes the product-shopper proximity measure and/or the product-shopper visibility measure. The report is illustrated at 100 in FIG. 8. The report may also include the various behavior statistics 108 described above.

Figure 10:
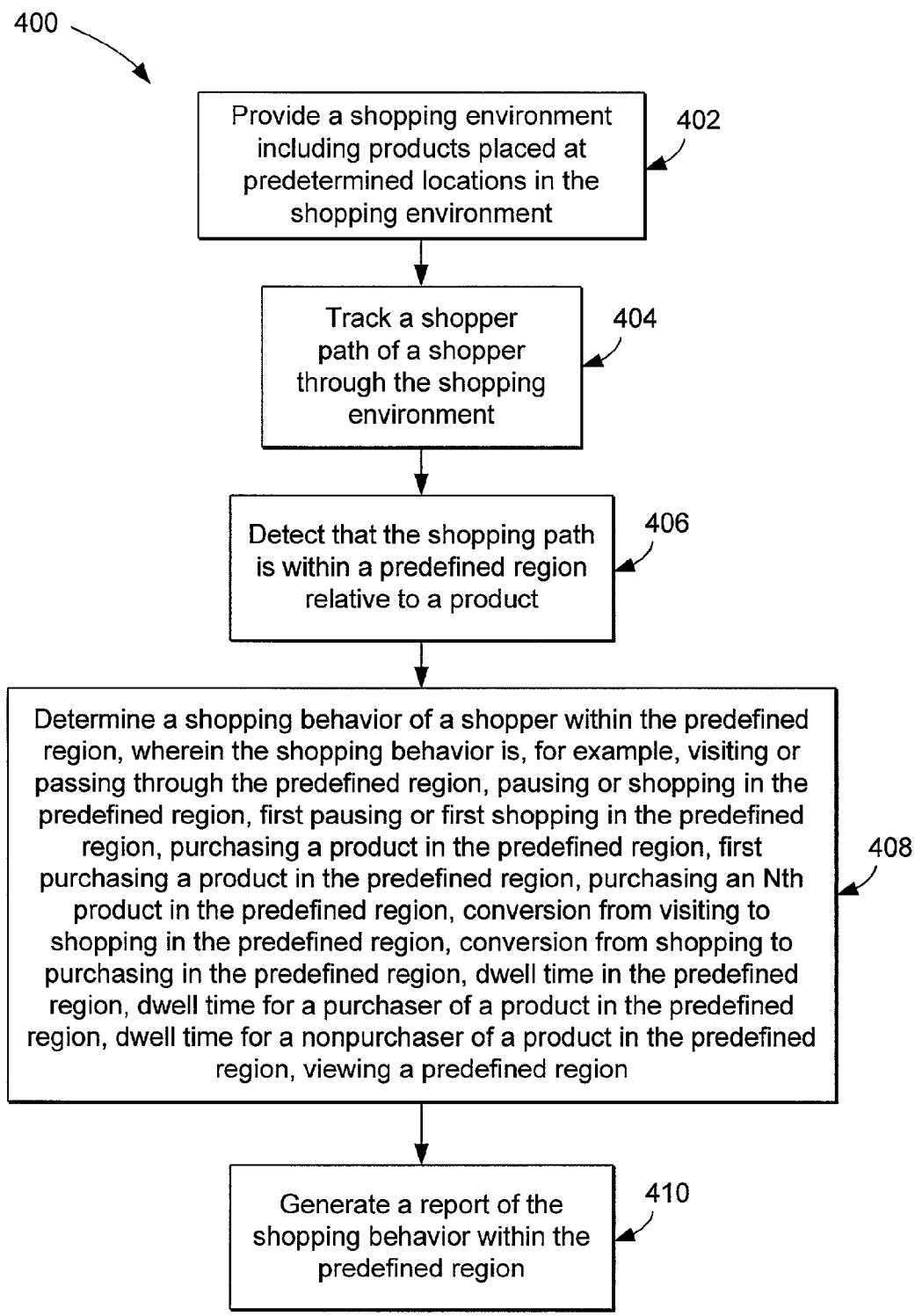
FIG. 10 is a flowchart of a method according to another embodiment of the present invention.

In FIG. 10, a method according to another embodiment of the present invention is shown generally at 400. Method 400 includes providing a shopping environment including products placed at predetermined locations in the shopping environment, at step 402. At 404, method 400 includes tracking a shopper path of a shopper through the shopping environment, as described above. The method may further include detecting that at least a portion of the shopper path exhibits at least one of the following patterns: zigzag pattern, excursion pattern, loiter pattern, destination pattern, and aisle-traverse pattern, described above. At 406, the method typically includes detecting that the shopping path is within a predefined region associated with one or more products, as described above.

At 408, the method further includes determining a shopping behavior of a shopper within the predefined region. The shopping behavior may be, for example, visiting or passing through the predefined region, pausing or shopping in the predefined region, first pausing or first shopping in the predefined region, purchasing a product in the predefined region, first purchasing a product in the predefined region, purchasing an Nth product in the predefined region, conversion from visiting to shopping in the predefined region, conversion from shopping to purchasing in the predefined region, dwell time in the predefined region, dwell time for a purchaser of a product in the predefined region, dwell time for a non-purchaser of a product in the predefined region, and/or viewing a predefined region or any of the various other behaviors 108, as described in detail above.

At 410, method 400 further includes generating a data compilation, also referred to as a report, of the shopping behavior within the predefined region. The report may take the form shown in FIG. 8, and may be product specific, zone (i.e., predefined region) specific, category or any other merchandising relevant grouping. The data compilation may be in print form, such as a book or binder of printouts, or in electronic form, such as a computer-readable file encoded on a CD-ROM, DVD-ROM or other media.

While the present invention has been particularly shown and described with reference to the foregoing preferred embodiments, those skilled in the art will understand that many variations may be made therein without departing from the spirit and scope of the invention as defined in the following claims. The description of the invention should be understood to include all novel and non-obvious combinations of elements described herein, and claims may be presented in this or a later application to any novel and non-obvious combination of these elements. Where the claims recite "a" or "a first" element or the equivalent thereof, such claims should be understood to include incorporation of one or more such elements, neither requiring nor excluding two or more such elements.

I claim:

1. A computer-implemented method for analyzing shopper behavior of one or more shopper(s) within a shopping environment, the method comprising:
   identifying a position of a product within the shopping environment;
   tracking shoppers on a plurality of shopper paths through the shopping environment, via a tracking system;
   determining a direction of travel of each shopper on a corresponding shopper path;
   calculating, by a computer, a simulated field of view of each shopper, based on the direction of travel; and
   calculating, by a computer, a visibility measure representing an extent to which the product can be seen by the shoppers on the plurality of shopping paths, the visibility measure being calculated at least in part by determining whether the product lies within the simulated field of view of each of the shoppers tracked on the shopper paths,
   wherein the shopping environment is divided into a plurality of predefined zones, including a zone in which the product is located, and adjacent zones from which the product may be seen, and wherein the visibility measure is calculated according to the formula:

$$\text{Visibility Measure} = \text{SUM}(1 \text{ to } z) \ [(\text{PASS})(T)(\sin \theta_s)(\sin \theta_a)]$$

wherein SUM(1 to z) is the sum of all zones from which the product can be seen;
   wherein PASS is a percentage of shoppers who pass through each summed zone;
   wherein T is a time period that the shoppers spend in each summed zone;
   wherein $\sin \theta_s$ is the sine of an angle formed between a line of dominant flow of shoppers traveling through each of the summed zones, and a line of sight to the product from the summed zone;
   wherein $\sin \theta_a$ is the sine of the angle formed between a front side of a display on which the product is positioned, and a line of sight to the product from the summed zone; and
   wherein D is the distance between the summed zone and the zone in which the product is located.

* * * * *

UNITED STATES PATENT AND TRADEMARK OFFICE
CERTIFICATE OF CORRECTION

PATENT NO. : 7,006,982 B2  Page 1 of 1
APPLICATION NO. : 10/115186
DATED : February 28, 2006
INVENTOR(S) : Herb Sorensen It is certified that error appears in the above-identified patent and that said Letters Patent is hereby corrected as shown below:

In the Claims

In claim 1, column 12, line 26, delete " Visibility Measure=SUM(1 to $z$) [(PASS)($T$)(sin $\theta_s$)(sin $\theta_a$)] " and;

In claim 1, column 12, line 26, insert -- $$\text{Visibility measure} = \text{Sum}(1 \text{ to } z) \frac{[(pass)(T)(sin\theta_s)(sin\theta_a)]}{D^2}$$ --.

Signed and Sealed this
Twenty-ninth Day of July, 2014

Michelle K. Lee
*Deputy Director of the United States Patent and Trademark Office*